United States Patent
Tokoyoda et al.

(10) Patent No.: US 11,289,899 B2
(45) Date of Patent: Mar. 29, 2022

(54) DIRECT-CURRENT BREAKING DEVICE

(71) Applicant: Mitsubishi Electric Corporation, Tokyo (JP)

(72) Inventors: Sho Tokoyoda, Tokyo (JP); Takashi Inagaki, Tokyo (JP); Kenji Kamei, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/256,794

(22) PCT Filed: Aug. 24, 2018

(86) PCT No.: PCT/JP2018/031383
§ 371 (c)(1),
(2) Date: Dec. 29, 2020

(87) PCT Pub. No.: WO2020/039580
PCT Pub. Date: Feb. 27, 2020

(65) Prior Publication Data
US 2021/0111556 A1    Apr. 15, 2021

(51) Int. Cl.
*H02H 7/22* (2006.01)
*H02J 3/36* (2006.01)

(52) U.S. Cl.
CPC . *H02H 7/22* (2013.01); *H02J 3/36* (2013.01)

(58) Field of Classification Search
CPC ............ H02H 3/16; H02H 3/087; H02H 7/22; H01H 33/596; H02J 3/36

(Continued)

(56) References Cited

U.S. PATENT DOCUMENTS

| 2016/0322178 A1* | 11/2016 | Park ..................... H02H 3/087 |
| 2017/0271100 A1 | 9/2017 | Ka et al. |
| 2018/0041021 A1* | 2/2018 | Backman ................. H02H 3/02 |

FOREIGN PATENT DOCUMENTS

| CN | 206559027 U * 10/2017 | |
| EP | 2894653 A1 * 7/2015 ........... H01H 33/596 |

(Continued)

OTHER PUBLICATIONS

International Search Report (with English Translation) and Written Opinion issued in corresponding International Patent Application No. PCT/JP2018/031383, 9 pages (dated Oct. 16, 2018).

*Primary Examiner* — Kevin J Comber
(74) *Attorney, Agent, or Firm* — Buchanan Ingersoll & Rooney PC

(57) ABSTRACT

A direct-current breaking device includes a main circuit breaker inserted on a DC line, a resonant circuit connected in parallel with the main circuit breaker, and a MOSA connected in parallel with the main circuit breaker via the resonant circuit. The resonant circuit includes first, second, third, and fourth switching elements, a capacitor, and a reactor. A first circuit unit including the first switching element and the second switching element connected in series with each other, and a second circuit unit including the third switching element and the fourth switching element connected in series with each other are connected in parallel. The capacitor is connected between a connection point of the first switching element and the second switching element and a connection point of the third switching element and the fourth switching element to constitute a bridge circuit. The bridge circuit and the reactor are in series with each other.

7 Claims, 13 Drawing Sheets

(58) Field of Classification Search
USPC .......................................................... 361/91.1
See application file for complete search history.

(56) References Cited

FOREIGN PATENT DOCUMENTS

| | | | | |
|---|---|---|---|---|
| EP | 3654359 | A1 | 5/2020 | |
| JP | S5834525 | A | 3/1983 | |
| JP | S59117027 | A | 7/1984 | |
| JP | S6377322 | A | 4/1988 | |
| JP | 2017004869 | A | 1/2017 | |
| JP | 6921364 | B1 * | 8/2021 | |
| KR | 20180050886 | A * | 5/2018 | |
| WO | WO-2015166600 | A1 * | 11/2015 | ............. H01H 33/59 |
| WO | 2016056274 | A1 | 4/2016 | |
| WO | WO-2016056274 | A1 * | 4/2016 | ............. H01H 71/24 |
| WO | WO-2016104623 | A1 * | 6/2016 | ........... H01H 33/596 |
| WO | 2019012609 | A1 | 1/2019 | |

* cited by examiner

DIRECT-CURRENT BREAKING DEVICE

FIELD

The present invention relates to a direct-current breaking device for interrupting direct current.

BACKGROUND

To achieve high-voltage direct-current (hereinafter referred to as "HVDC") power transmission, development of high-voltage direct-current breaking devices (hereinafter simply referred to as "direct-current breaking devices") have recently been accelerated in many countries. In HVDC power transmission, high-voltage direct current flows through power lines. Direct current has no current zero, unlike alternating current. Thus, to interrupt direct current, a current zero is forcibly created between the poles of a main circuit breaker. Patent Literature 1 mentioned below teaches a technology for providing a commutation circuit including a capacitor and a reactor, creating a current zero by superimposing a resonant current from the commutation circuit onto a main circuit breaker, and interrupting direct current at the current zero. The commutation circuit is also called a "resonant circuit". In addition, the interruption method according to this technology is called a "forced extinction procedure".

After interruption of a fault current, the main circuit breaker of the direct-current breaking device is immediately closed so that power transmission of the system is resumed. This control is called "high-speed reclosure".

CITATION LIST

Patent Literature

Patent Literature 1: Japanese Patent Application Laid-open No. S58-34525

SUMMARY

Technical Problem

Conventional direct-current breaking devices using the forced extinction including that of Patent Literature 1 require an additional resonant circuit for high-speed reclosure in order to perform a second interruption after high-speed reclosure after performing a first interruption. The reason why an additional resonant circuit is required is, that it difficult to recharge a capacitor used for the first interruption to a specified voltage within a time period within several hundred ms, for example, after the first interruption and before the second interruption. A resonant circuit, however, includes a high-voltage capacitor bank, which is a significant factor in increasing the device size and preventing miniaturization. There has thus been demand for development of a direct-current breaking device that needs no additional resonant circuit.

The present invention has been made in view of the above, and an object thereof is to provide a direct-current breaking device capable of performing operating duty of high-speed reclosure in HVDC power transmission without provision of an additional resonant circuit.

Solution to Problem

To solve the aforementioned problems and achieve the object, a direct-current breaking device according to the present invention includes a main circuit breaker inserted on a DC line, a resonant circuit connected in parallel with the main circuit breaker, and an energy absorbing unit connected in parallel with the main circuit breaker via the resonant circuit. The resonant circuit includes first, second, third, and fourth switching elements, a capacitor, and a reactor. A first circuit unit including the first switching element and the second switching element connected in series with each other, and a second circuit unit including the third switching element and the fourth switching element connected in series with each other are connected in parallel. The capacitor is connected between a connection point of the first switching element and the second switching element and a connection point of the third switching element and the fourth switching element to constitute a bridge circuit. The bridge circuit and the reactor are connected in series with each other.

Advantageous Effects of Invention

A direct-current breaking device according to the present invention produces an effect of being capable of performing operating duty of high-speed reclosure in HVDC power transmission without provision of an additional resonant circuit.

DESCRIPTION OF EMBODIMENTS

A direct-current breaking device according to embodiments of the present invention will be described in detail below with reference to the drawings. Note that the present invention is not limited to the embodiments below. In addition, electrical connection will be simply referred to as "connection" in the description below.

First Embodiment

Figure 1:
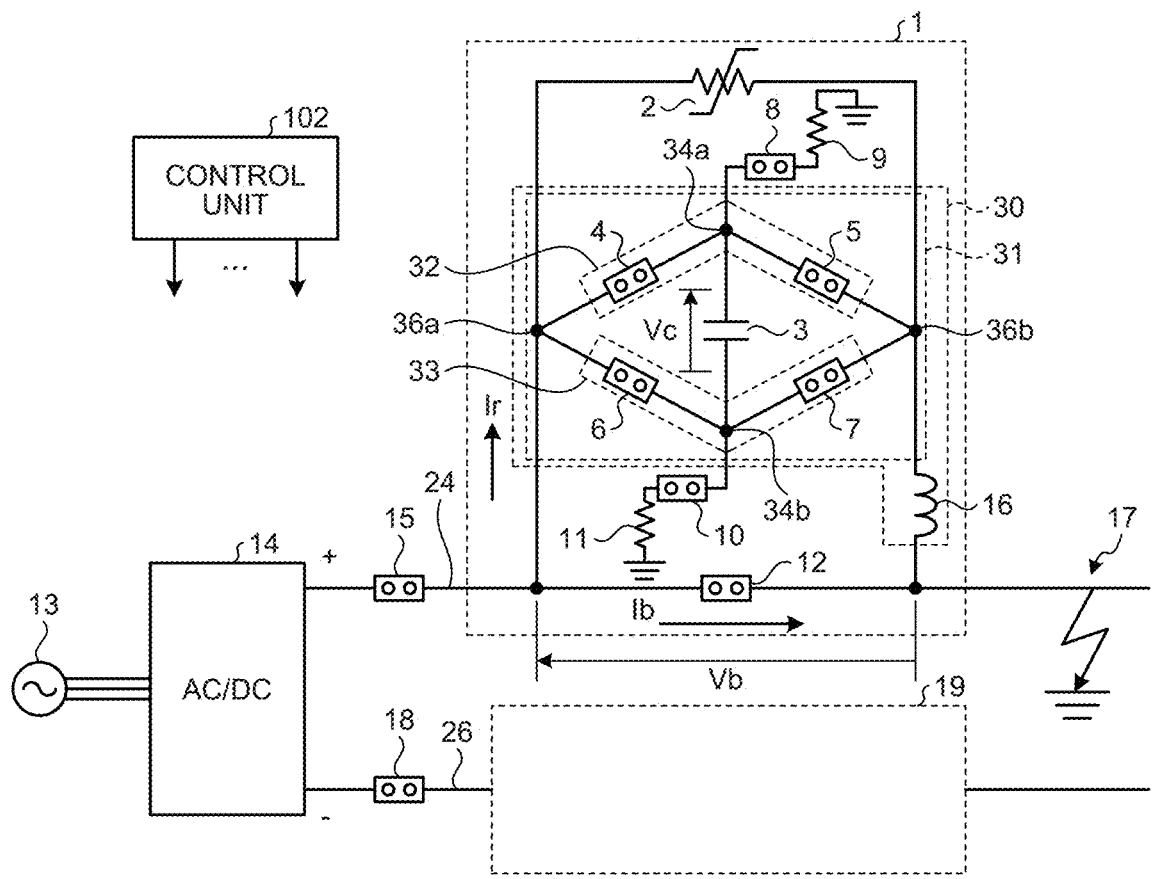
FIG. 1 is a diagram illustrating an example of a circuit configuration of a direct-current breaking device according to a first embodiment.
Figure 2:
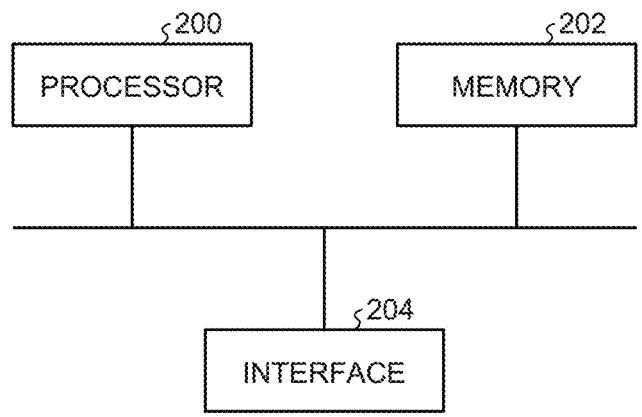
FIG. 2 is a diagram illustrating an example of a hardware configuration implementing the functions of a control unit according to the first embodiment.

FIG. 1 is a diagram illustrating an example of a circuit configuration of a direct-current breaking device according to a first embodiment. FIG. 2 is a diagram illustrating an example of a hardware configuration implementing the functions of a control unit according to the first embodiment.

The direct-current breaking device 1 according to the first embodiment includes, as main components, a main circuit breaker 12, a resonant circuit 30, a lightning arrester (metal oxide surge arrestor: hereinafter referred to as a "MOSA") 2, and a control unit 102. The MOSA 2 is an example of an energy absorbing unit. The main circuit breaker 12 is inserted on a DC line 24 on the positive polarity side.

The main circuit breaker 12 is connected with an AC system 13 via a disconnector 15 and an AC/DC converter (referred to as "AC/DC" in FIG. 1) 14. The AC/DC converter 14 is a power converter that converts alternating current applied by the AC system 13 into direct current. The disconnector 15 is a switching element for disconnecting the main circuit breaker 12 provided on the DC line 24 from the AC system 13. FIG. 1 illustrates a configuration in which a disconnector 18 and a direct-current breaking device 19 are also provided on a DC line 26 on the negative polarity side. Because the basic configuration of the direct-current breaking device 19 on the negative polarity side is similar to that of the direct-current breaking device 1 on the positive polarity side, a detailed configuration of the direct-current breaking device 19 is not illustrated in FIG. 1.

Current flows through the DC line 24 along a path indicated by an arrow. This current will be referred to as a "main circuit breaker current" and represented by "Ib". Note that the direction indicated by the arrow is defined as a "positive" direction of the current. On the basis of this definition, the left side of the drawing will be referred to as "upstream" and the right side thereof will be referred to as "downstream" for convenience.

The resonant circuit 30 is a circuit that, when a fault current flows through the DC line 24, generates a resonance current to be superimposed on the fault current. The resonant circuit 30 includes a first switching element 4, a second switching element 5, a third switching element 6, a fourth switching element 7, a capacitor 3, and a reactor 16. The first switching element 4 and the second switching element 5 are connected in series with each other and constitute a first circuit unit 32. The third switching element 6 and the fourth switching element 7 are connected in series with each other and constitute a second circuit unit 33. The first circuit unit 32 and the second circuit unit 33 are connected in parallel. The capacitor 3 is connected between a connection point 34a of the first switching element 4 and the second switching element 5 and a connection point 34b of the third switching element 6 and the fourth switching element 7. The first circuit unit 32, the second circuit unit 33, and the capacitor 3 constitute a bridge circuit 31. In addition, in the resonant circuit 30, the bridge circuit 31 and the reactor 16 are connected in series with each other. While a configuration in which one end of the reactor 16 is connected to a connection point 36b of the second switching element 5 and the fourth switching element 7, and the other end of the reactor 16 is connected to the DC line 24 on the downstream side of the main circuit breaker 12 is illustrated in FIG. 1, the configuration is not limited thereto. A configuration in which one end of the reactor 16 is connected to a connection point 36a of the first switching element 4 and the third switching element 6, and the other end of the reactor 16 is connected to the DC line 24 on the upstream side of the main circuit breaker 12 may be employed.

The main circuit breaker 12 is assumed to be constituted by mechanical switches. While one example of the main circuit breaker 12 is a vacuum valve with high current interruption capability, a switching element other than the vacuum valve may be used as the main circuit breaker in addition, the first switching element 4, the second switching element 5, the third switching element 6, and the fourth switching element 7 are also assumed to be constituted by mechanical switches. While a vacuum valve with high current interruption capability is an example of each of the switching elements, switching elements other than vacuum valves may be used.

The MOSA 2 is connected in parallel with the main circuit breaker 12 together with the resonant circuit 30. In terms of circuitry, a series circuit constituted by the MOSA 2 and the reactor 16 is connected in parallel with the main circuit breaker 12.

A charging resistor 9, which is a first charging resistor, is connected to the connection point 34a of the bridge circuit 31 via a charging switch 8, which is a first switch, and a charging resistor 11, which is a second charging resistor, is connected to the connection point 34b of the bridge circuit 31 via a charging switch 10, which is a second switch. An example of the charging switches 8 and 10 is a disconnector. Thus, one end of the capacitor 3 is connected to the charging switch 8, and the other end of the capacitor 3 is connected to the charging switch 10. While a configuration in which one end of the charging resistor 9 is connected to the charging switch 8 and the other end of the charging resistor 9 is grounded is illustrated in FIG. 1, the order of connection of the charging switch 8 and the charging resistor 9 may be reversed. Specifically, a configuration in which one end of the charging resistor 9 is connected to the connection point 34a and the other end of the charging resistor 9 is grounded via the charging switch 8 may be employed. Similar configurations are applicable to the charging switch 10 and the charging resistor 11.

In FIG. 1, "VC" represents a voltage appearing across the capacitor 3 as a result of charging the capacitor 3. The voltage appearing across the capacitor 3 will be referred to as a "capacitor inter-terminal voltage". Note that the direction indicated by an arrow is assumed to be a "positive" direction of the voltage. Specifically, a state in which the voltage on the connection point 34a side of the capacitor 3 is higher than the voltage on the connection point 34b side thereof is defined as a "positive" capacitor inter-terminal voltage Vc. For charging the capacitor 3 with positive polarity, the charging switch 8 is opened and the charging switch 10 is closed. For charging the capacitor 3 with negative polarity, the charging switch 10 is opened and the charging switch 8 is closed. Details of the operation at charging will be described later.

In addition, in FIG. 1, "Vb" represents a voltage appearing between the poles of the main circuit breaker 12. The voltage appearing between the poles of the main circuit breaker 12 will be referred to as an "inter-pole voltage". Note that the direction indicated by an arrow is assumed to be a "positive" direction of the voltage. Specifically, a state in which the voltage on the upstream side of the main circuit breaker 12 is higher than the voltage on the downstream side thereof is defined as a "positive" inter-pole voltage Vb.

Furthermore, a fault point 17 of an assumed ground fault is illustrated in FIG. 1. "Ir" in FIG. 1 represents a resonant current to be superimposed from the capacitor 3 of the resonant circuit 30 onto the main circuit breaker 12 when a ground fault has occurred at the fault point 17. This current is referred to as a "resonant current", and the direction indicated by an arrow is defined as a "positive" direction of the resonant current Ir. Note that the operation upon a fault will be described later.

The control unit 102 controls the main circuit breaker 12, the first switching element 4, the second switching element 5, the third switching element 6, the fourth switching element 7, and opening and closing of charging switches 8 and 10. Note that the main circuit breaker 12, the first switching element 4, the second switching element 5, the third switching element 6, the fourth switching element 7, the charging switches 8 and 10, and the disconnectors 15 and 18 may collectively be referred to as "switches".

As illustrated in FIG. 2, for implementing the functions of the control unit 102, a configuration including a processor 200 that performs computation, a memory 202 in which programs to be read by the processor 200 are saved, and an interface 204 for signal input and output can be used. Programs for controlling opening and closing of the respective switches are held in the memory 202. The control unit 102 performs control that will be described later by providing and receiving necessary information via the interface 204 and causing the processor 200 to execute the programs held in the memory 202.

Note that the processor 200 may be a computation means such as a computing device, a microprocessor, a microcomputer, a central processing unit (CPU), or a digital signal processor (DSP). In addition, the memory 202 is a nonvolatile or volatile semiconductor memory such as a random access memory (RAM), a read only memory (ROM), a flash memory, an erasable programmable ROM (EPROM), or an electrically EPROM (EEPROM; registered trademark).

Next, charging operation of the direct-current breaking device 1 according to the first embodiment will be explained with reference to FIGS. 3 to 6. Note that the operation described below is controlled by the control unit 102. For simplicity of explanation, the recitation of the "control unit 102" that is the subject of the control may be omitted where appropriate in the following description.

Figure 3:
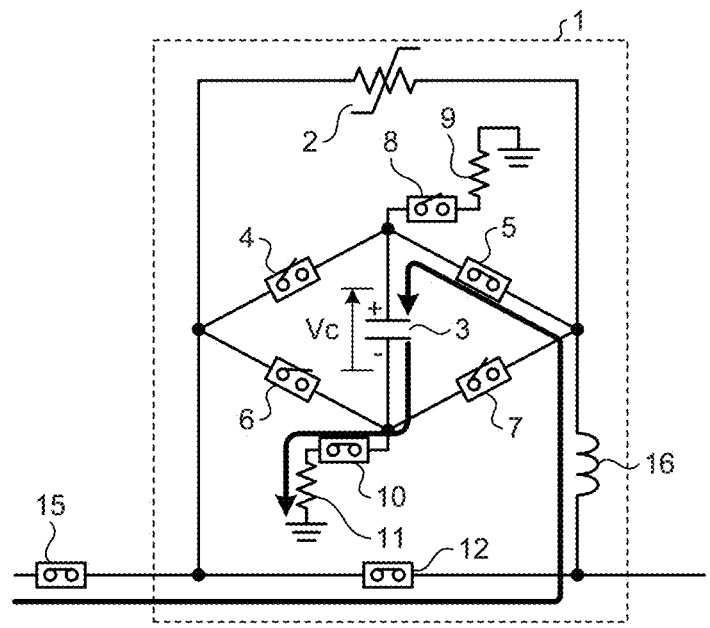
FIG. 3 is a first diagram for explaining charging operation of the direct-current breaking device according to the first embodiment.

FIG. 3 is a first diagram for explaining the charging operation of the direct-current breaking device 1 according to the first embodiment. In FIG. 3, the states of the respective switches are as follows: the first switching element 4 is "open", the second switching element 5 is "closed", the third switching element 6 is "open", the fourth switching element 7 is "open", the charging switch 8 is "open", the charging switch 10 is "closed", the main circuit breaker 12 is "closed", and the disconnector 15 is "closed". In this case, current flows through a path of the disconnector 15, the main circuit breaker 12, the reactor 16, the second switching element 5, the capacitor 3, the charging switch 10, and the charging resistor 11, and the capacitor 3 is charged with positive polarity.

Figure 4:
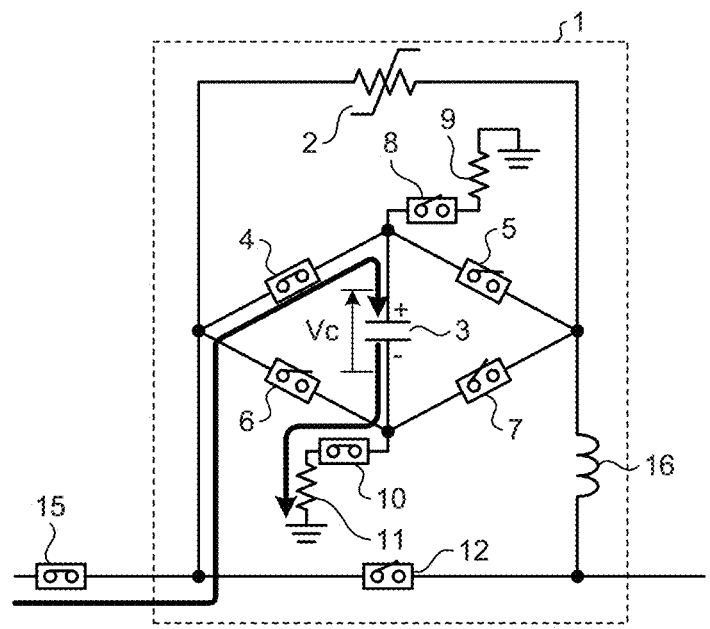
FIG. 4 is a second diagram for explaining the charging operation of the direct-current breaking device according to the first embodiment.

FIG. 4 is a second diagram for explaining the charging operation of the direct-current breaking device 1 according to the first embodiment. In FIG. 4, the states of the respective switches are as follows: the first switching element 4 is "closed", the second switching element 5 is "open", the third switching element 6 is "open", the fourth switching element 7 is "open", the charging switch 8 is "open", the charging switch 10 is "closed", and the disconnector 15 is "closed". Note that the main circuit breaker 12 may be either "closed" or "open". In this case, current flows through a path of the disconnector 15, the first switching element 4, the capacitor 3, the charging switch 10 and the charging resistor 11, and the capacitor 3 is charged with positive polarity.

Figure 5:
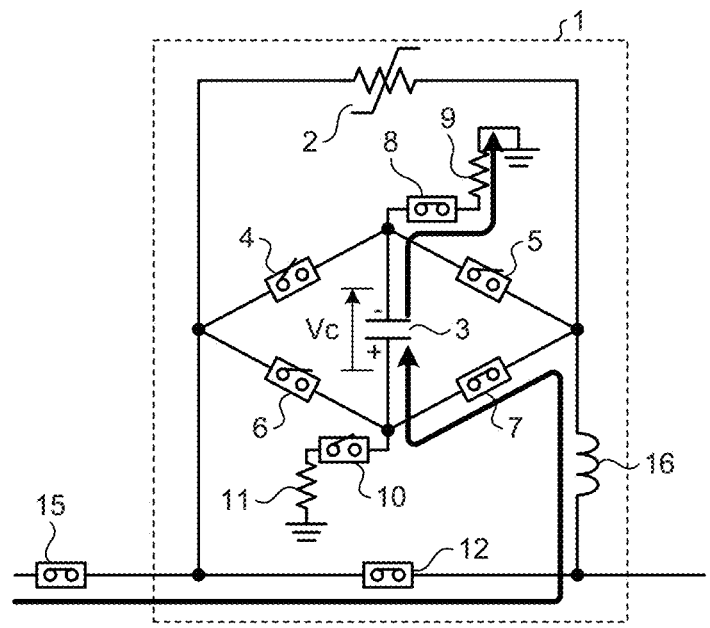
FIG. 5 is a third diagram for explaining the charging operation of the direct-current breaking device according to the first embodiment.

FIG. 5 is a third diagram for explaining the charging operation of the direct-current breaking device 1 according to the first embodiment. In FIG. 5, the states of the respective switches are as follows: the first switching element 4 is "open", the second switching element 5 is "open", the third switching element 6 is "open", the fourth switching element 7 is "closed", the charging switch 8 is "closed", the charging switch 10 is "open", the main circuit breaker 12 is "closed", and the disconnector 15 is "closed". In this case, current flows through a path of the disconnector 15, the main circuit breaker 12, the reactor 16, the fourth switching element 7, the capacitor 3, the charging switch 8, and the charging resistor 9, and the capacitor 3 is charged with negative polarity.

Figure 6:
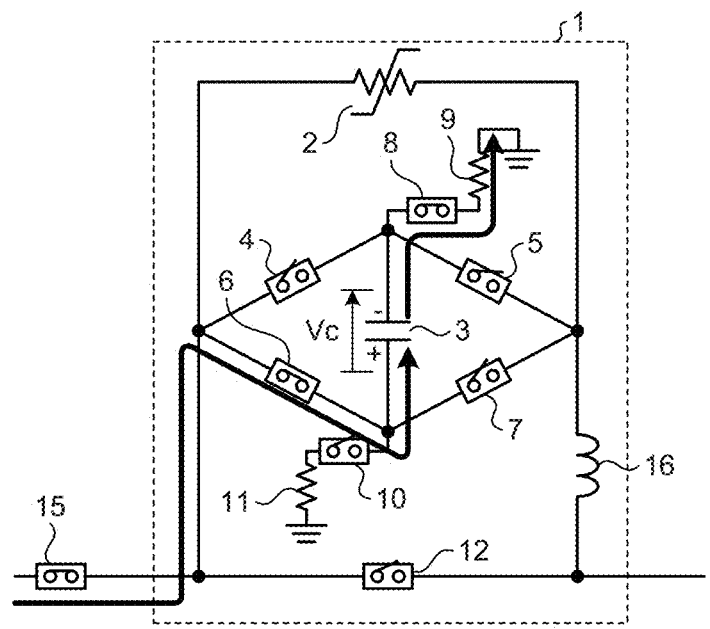
FIG. 6 is a fourth diagram for explaining the charging operation of the direct-current breaking device according to the first embodiment.

FIG. 6 is a fourth diagram for explaining the charging operation of the direct-current breaking device 1 according to the first embodiment. In FIG. 6, the states of the respective switches are as follows: the first switching element 4 is "open", the second switching element 5 is "open", the third switching element 6 is "closed", the fourth switching element. 7 is "open", the charging switch 8 is "closed", the charging switch 10 is "open", and the disconnector 15 is "closed". Note that the main circuit breaker 12 may be either "closed" or "open". In this case, current flows through a path of the disconnector 15, the third switching element 6, the capacitor 3, the charging switch 8, and the charging resistor 9, and the capacitor 3 is charged with negative polarity.

As described above, the direct-current breaking device 1 according to the first embodiment controls any one of the first switching element 4, the second switching element 5, the third switching element 6, and the fourth switching element 7 and either one of the charging switch 8 and the charging switch 10 to be "closed" depending on the state of the main circuit breaker 12, and the capacitor 3 can thus be charged with positive polarity or negative polarity. In addition, upon completion of charging the capacitor 3, all of the first switching element 4, the second switching element 5, the third switching element 6, the fourth switching element 7, the charging swatch 8, and the charging switch 10 are controlled to be "open". As a result, the capacitor 3 is held in a state charged to a voltage corresponding to the system voltage.

Figure 7:
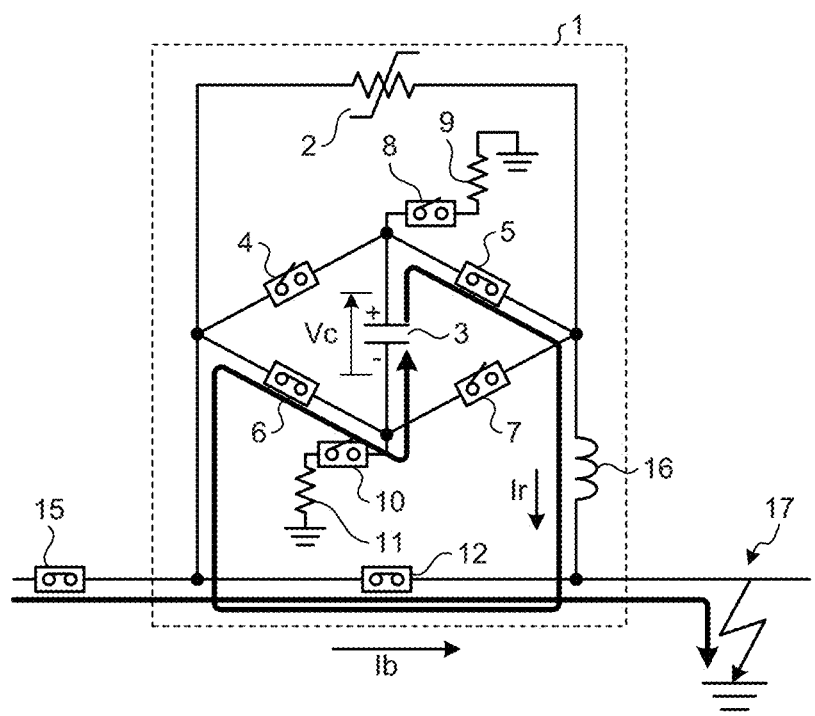
FIG. 7 is a first diagram for explaining operation at a fault of the direct-current breaking device according to the first embodiment.

Next, operation at a fault of the direct-current breaking device 1 according to the first embodiment will be explained with reference to FIG. 7. FIG. 7 is a first diagram for explaining the operation at a fault of the direct-current breaking device 1 according to the first embodiment.

When a ground fault has occurred at the fault point 17, a fault current in the positive direction of the main circuit breaker current Ib as defined above flows. When the fault current flows, the control unit 102 controls the second switching element 5 and the third switching element 6 to be "closed". In addition, to interrupt the fault current, the main circuit breaker 12 is controlled to be "open". The second switching element 5 and the third switching element 6 are two switching elements on opposite sides of the bridge circuit 31 facing each other. Thus, as illustrated in FIG. 7, the resonant current Ir in the positive direction as defined above is superimposed onto the main circuit breaker 12. As a result, a current zero is created in the fault current, and the fault current can be interrupted at the current zero or a current point near the current zero. While an operation when the capacitor 3 is charged with positive polarity is illustrated in FIG. 7, the first switching element 4 and the fourth switching element 7 may be controlled to be "closed" when the capacitor 3 is charged with negative polarity. The first switching element 4 and the fourth switching element 7 are also two switching elements on opposite sides of the bridge circuit 31 facing each other.

Figure 8:
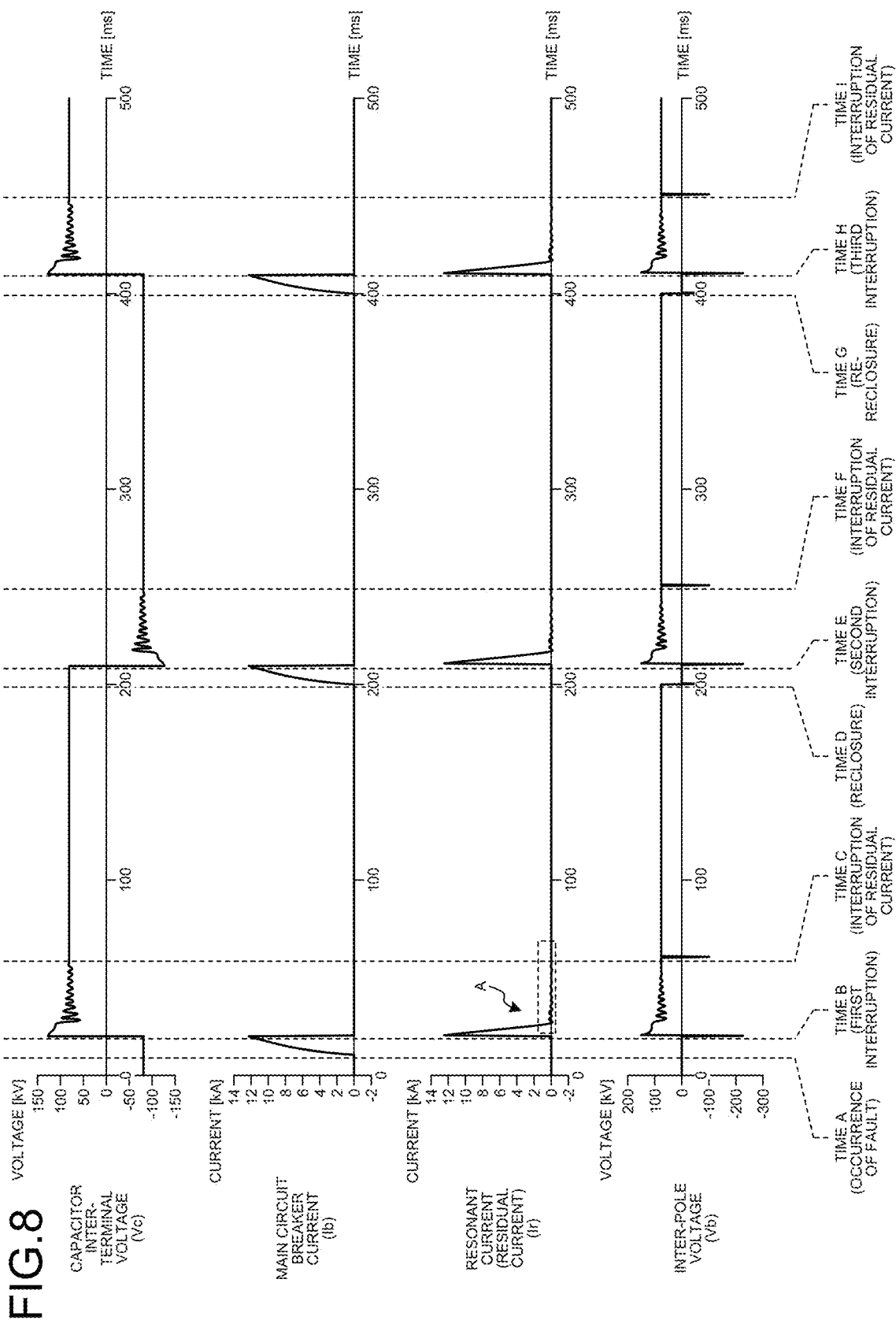
FIG. 8 is a time-series waveform chart for explaining operation of the direct-current breaking device according to the first embodiment when high-speed reclosure is performed.
Figure 9:
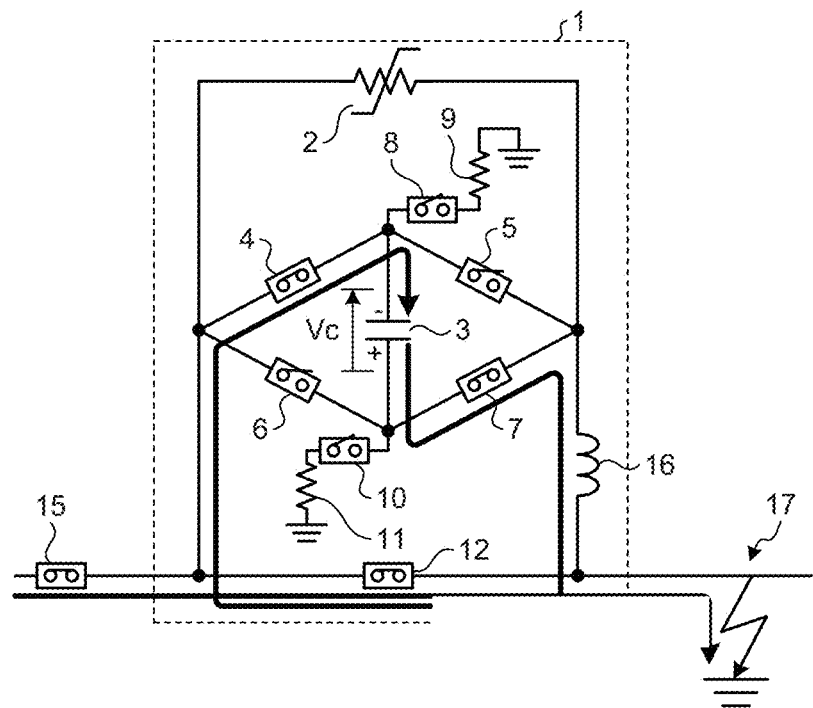
FIG. 9 is a second diagram for explaining the operation at a fault of the direct-current breaking device according to the first embodiment.
Figure 10:
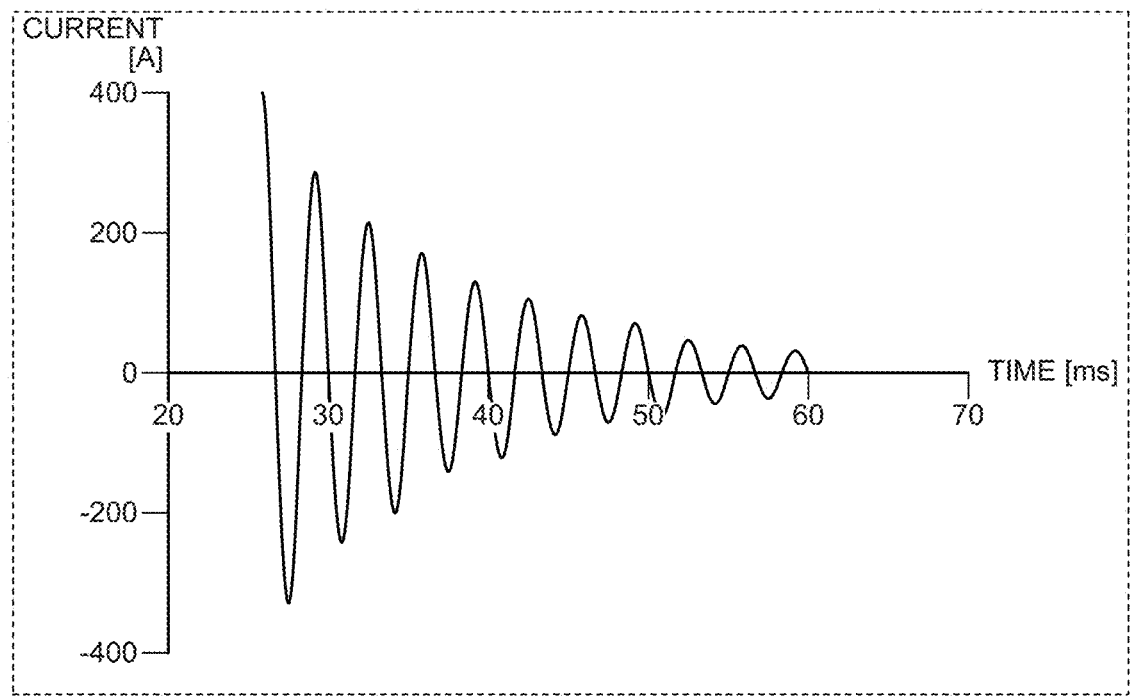
FIG. 10 is an enlarged waveform chart of a part A in FIG. 8.
Figure 11:
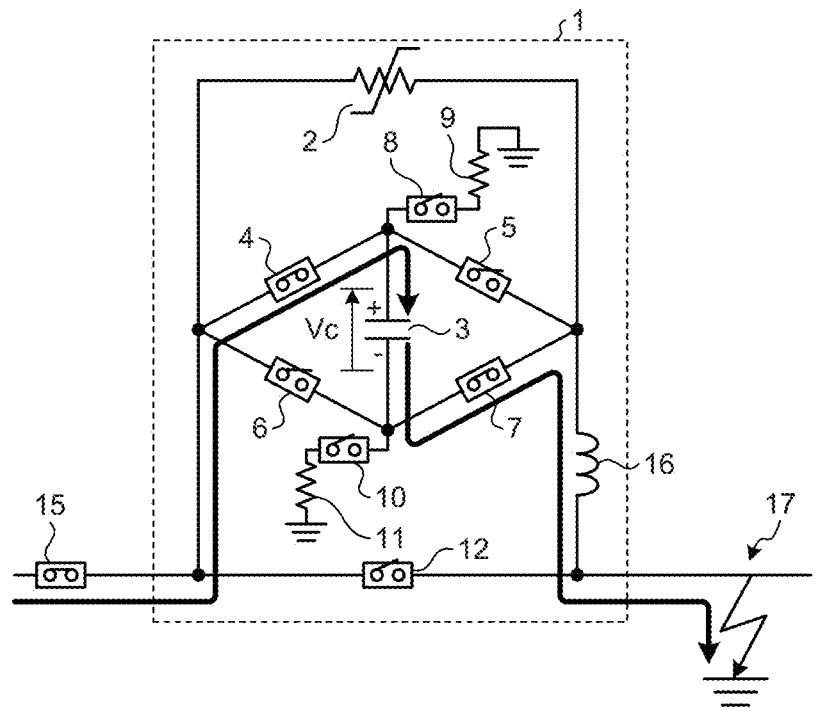
FIG. 11 is a first diagram for explaining a charging path immediately after fault interruption in the direct-current breaking device according to the first embodiment.
Figure 12:
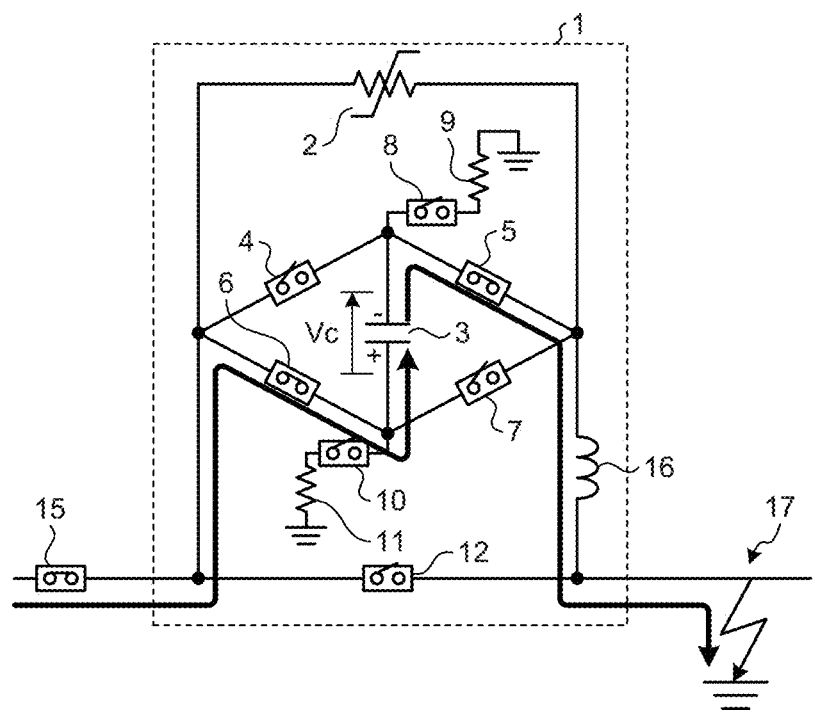
FIG. 12 is a second diagram for explaining the charging path immediately after fault interruption in the direct-current breaking device according to the first embodiment.

Next, operation of the direct-current breaking device 1 according to the first embodiment when high-speed reclosure is performed will be explained with reference to FIGS. 1, 8 to 12. FIG. 8 is a time-series waveform chart for explaining operation of the direct-current breaking device 1 according to the first embodiment when high-speed reclosure is performed. FIG. 9 is a second diagram for explaining the operation at a fault of the direct-current breaking device 1 according to the first embodiment. FIG. 10 is an enlarged waveform chart of a part A in FIG. 8. FIG. 11 is a first diagram for explaining a charging path immediately after fault interruption in the direct-current breaking device 1 according to the first embodiment. FIG. 12 is a second diagram for explaining the charging path immediately after fault interruption in the direct-current breaking device 1 according to the first embodiment.

FIG. 8 illustrates waveforms of the capacitor inter-terminal voltage Vc, the main circuit breaker current Ib, the resonant current Ir, and the inter-pole voltage Vb, in this order from the top. These waveforms are current waveforms or voltage waveforms in the respective units assumed in a case where high-speed reclosure is repeated and interruption is performed up to three times.

First, in an initial state, the capacitor 3 is shown to be charged with negative polarity because the capacitor inter-terminal voltage Vc is negative. Then, when a fault occurs at time A, an opening command from the control unit 102 is input to the direct-current breaking device 1 at time B, so that the main circuit breaker 12 is controlled to be "open" and the first switching element 4 and the fourth switching element 7 are controlled to be "closed". A state in which the fault current and the resonant current Ir flow is illustrated in FIG. 9. In comparison with FIG. 7, the charging polarity of the capacitor 3 and the switching elements controlled to be "closed" are different. As is result of this control, a zero point is created in the fault current flowing through the main circuit breaker 12, and the fault current flowing through the main circuit breaker 12 is interrupted.

As a result of interruption of the fault current, residual electromagnetic energy in an inductance, which is not illustrated, of the AC, system 13 is transferred between the AC system 13 and the capacitor 3. Thus, overvoltage occurs across the bridge circuit 31. In the meantime, the overvoltage is reduced by the MOSA 2 connected with the capacitor 3 via at least two of the first switching element 4, the second switching element 5, the third switching element 6, and the fourth switching element 7. The energy reduced by the MOSA 2 becomes a current flowing to the fault point via the MOSA 2. The current is called a "residual current". In FIG. 8, the current at the part A indicated by a rectangular box of a broken line corresponds to the residual current. FIG. 10 illustrates an enlarged waveform of the residual current, which continues to flow via a leak resistance of the MOSA 2, the capacitor 3, and the reactor 16. In addition, to prepare for high-speed reclosure expected several hundred ms after a first interruption, the first switching element 4 and the fourth switching element 7 controlled to be "closed" at the first interruption are controlled to be "open" at time C. As a result, the residual current is interrupted. Note that the first switching element 4, the second switching element 5, the third switching element 6, and the fourth switching element 7 are switching element having not only closing functions but also interrupting functions. As a result of the series of control and operations. The first fault current is removed. In addition, because the capacitor 3 is disconnected from the system, the capacitor inter-terminal voltage Vc is maintained for the next interruption.

FIG. 11 illustrates a charging path of the capacitor 3 immediately after fault interruption. As described above, immediately after the first interruption, the first switching element 4 and the fourth switching element 7 are controlled to be "closed". Thus, the state immediately after the main circuit breaker 12 opened is as illustrated in FIG. 11. In this state, a charging path to the capacitor is formed toward the fault point 17. As illustrated, the charging path is a path of the first switching element 4, the capacitor 3, the fourth switching element 7, and the reactor 16 this order. Consequently, the capacitor 3 is charged with positive polarity, which is the reverse of the polarity in the initial state.

The description refers back to FIG. 8, and the explanation of the high-speed reclosure operation will be continued. At time D in FIG. 8, high-speed reclosure is performed. In FIG. 8, a case where a fault has not been resolved or a fault has occurred again is assumed. At time E, re-interruption, that is, a second interruption is performed. Note that the polarity of the charging voltage of the capacitor 3 is the reverse of that in the initial state before the first interruption, that is, positive polarity. Thus, in the second interruption, the main circuit breaker 12 is controlled to be "open" and the second switching element 5 and the third switching element 6 are controlled to be "closed" at time E. Note that the state in this process is as illustrated in FIG. 7. As a result of this control, a zero point is created in the fault current flowing through the main circuit breaker 12, and the fault current flowing through the main circuit breaker 12 is interrupted. Note that, regarding subsequent operations, that is, specifically, interruption of residual current at time F, re-reclosure at time G, a third interruption at time H, and interruption or residual current at time I, the first operation and the second operation are alternately repeated.

FIG. 12 illustrates a charging path of the capacitor 3 immediately after fault interruption, which is different from that of FIG. 11. As described above, in the second interruption, the second switching element 5 and the third switching element 6 are controlled to be "closed". Thus, the state immediately after the main circuit breaker 12 is opened is as illustrated in FIG. 12. In this state, a charging path to the capacitor 3 is formed toward the fault point 17. As illustrated, the charging path is a path of the third switching element 6, the capacitor 3, the second switching element 5, and the reactor 16 in this order. Consequently, the capacitor 3 is charged with negative polarity, which is the reverse of the polarity in the state immediately after the first interruption.

At present, because there are no international standards relating to direct-current breaking devices, the operating duty of direct-current breaking devices is not specified. On the assumption that the operating duty is specified on the basis of past international search results, however, there is a possibility that a high-speed interruption operation such as within 10 ms from occurrence of a fault, for example, is required of a direct-current breaking device. Thus, the capacitor needs to be charged before the direct-current breaking device is input to the system.

According to the direct-current breaking device 1 according to the first embodiment, the capacitor 3 can be charged with positive polarity and negative polarity even when the main circuit breaker 12 is in the open state as explained with reference to FIGS. 4 and 6. Thus, use of the direct-current breaking device 1 according to the first embodiment enables charging of the capacitor 3 to be completed before the direct-current breaking device 1 is input to the system.

In addition, according to the direct-current breaking device 1 according to the first embodiment, the capacitor 3 can be charged with positive polarity and negative polarity when the main circuit breaker 12 is in the closed state as explained with reference to FIGS. 3 to 6. Thus, the capacitor 3 can be charged immediately after the main circuit breaker 12 is installed. In addition, the capacitor 3 can be recharged during normal operation in which the main circuit breaker 12 is closed.

Furthermore, according to the direct-current breaking device 1 according to the first embodiment, because the capacitor 3 can be charged with either of positive polarity and negative polarity, suitable charging polarity depending on the condition can be selected.

As described above, according to the direct-current breaking device according to the first embodiment, the resonant circuit connected in parallel with the main circuit breaker is constituted by the first circuit unit and the second circuit unit connected in parallel, in which the first circuit unit includes the first switching element and the second switching element are connected in series with each other, and the second circuit unit includes the third switching element and the fourth switching element connected in series with each other. In addition, the bridge circuit in which the capacitor is connected between the connection point of the first switching element and the second switching element and the connection point of the third switching element and the fourth switching element is provided. As a result, charging of the capacitor can be completed before the direct-current breaking device is input to the system, and the direct-current breaking device is thus capable of performing operating duty of high-speed reclosure in HVDC power transmission without provision of an additional resonant circuit.

Second Embodiment

Figure 13:
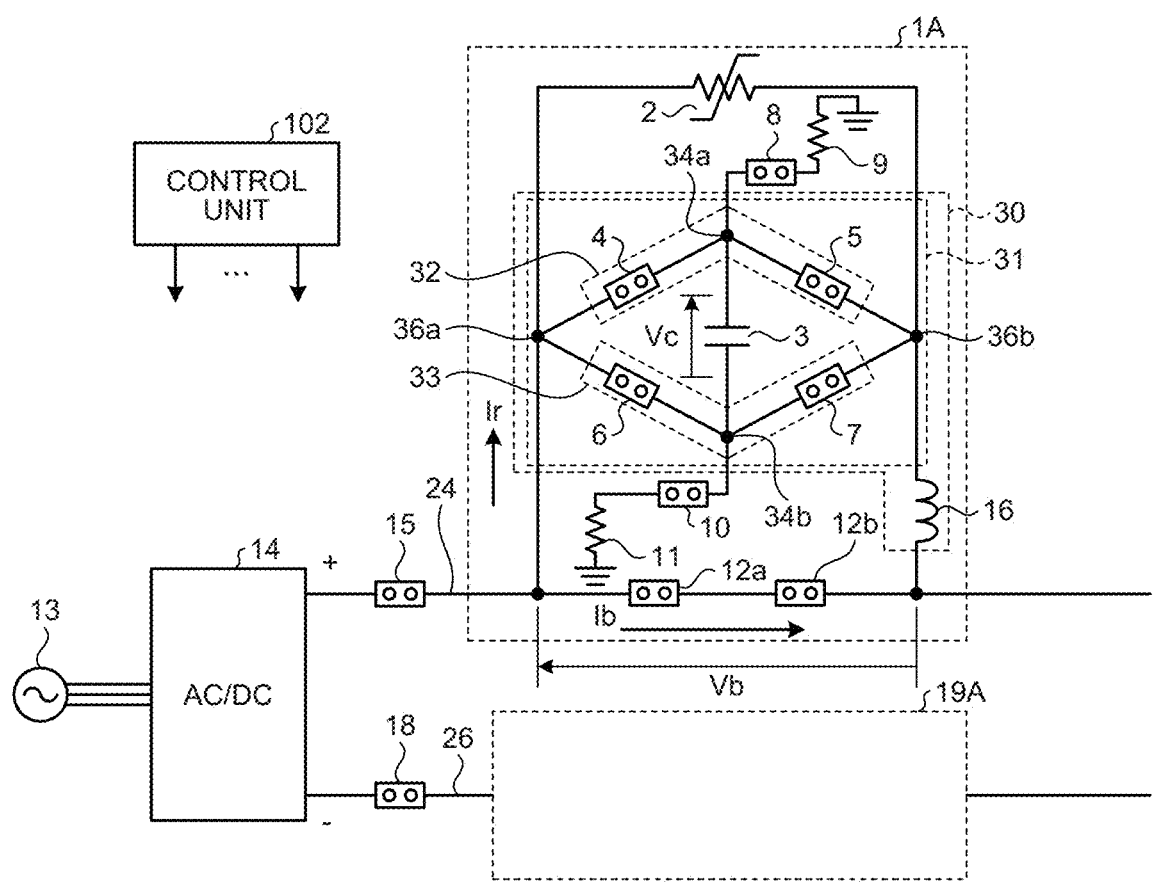
FIG. 13 is a diagram illustrating an example of a circuit configuration of a direct-current breaking device according to a second embodiment.

FIG. 13 is a diagram illustrating an example of a circuit configuration of a direct-current breaking device 1A according to a second embodiment. The direct-current breaking device 1A according to the second embodiment illustrated in FIG. 13 includes two main circuit breakers 12a and 12b connected in series with each other and replacing the one main circuit breaker 12 in the configuration of the first embodiment illustrated in FIG. 1. Because the direct-current breaking device 19 on the negative polarity side has a similar configuration, the direct-current breaking device is represented by 19A in FIG. 13. Note that the other configuration is the same as or equivalent to that in FIG. 1, and the same or equivalent components are represented by the same reference numerals and redundant description thereof will be omitted.

In the direct-current breaking device 1A according to the second embodiment, the main circuit breaker 12a, which is a first main circuit breaker, is used for interruption at an odd number of times, for example, and the main circuit breaker 12b, which is a second main circuit breaker, is used for interruption at an even number of times, for example. Naturally, the order of interruption of the main circuit breaker 12a and the main circuit breaker 12b may be reversed. Specifically, the main circuit breaker 12a, which is the first main circuit breaker, is used for interruption at an even number of times, and the main circuit breaker 12b, which is the second main circuit breaker, is used for interruption at an odd number of times. In ether case, the main circuit breaker 12a and the main circuit breaker 12b are alternately used in interruption and in closing.

In the first and second embodiments, the main (circuit breaker 12 is assumed to be constituted by mechanical switches. Typically, mechanical switches are said that the transitions thereof from "closed" to "open" which are interrupting operations, are slower than the transitions thereof from "open" to "closed", which are closing operations. Thus, there may be a case where one main circuit breaker is not sufficient to meet a high-speed request when an interruption command is output after a closing command is output. In contrast, in the case where two main circuit breakers connected in series with each other are included as in the second embodiment, even when a closing command is output and one of the main circuit breakers is in a closing operation, an opening command can be output to the other main circuit breaker, which enables the speed of opening operations of the whole main circuit breakers to be increased.

As described above, according to the direct-current breaking device 1A according to the second embodiment, the main circuit breaker is constituted by two main circuit breakers connected in series with each other, and the two main circuit breakers are used alternately in interruption and in closing. This enables the speed of opening operations of the whole main circuit breakers to be increased.

Third Embodiment

Figure 14:
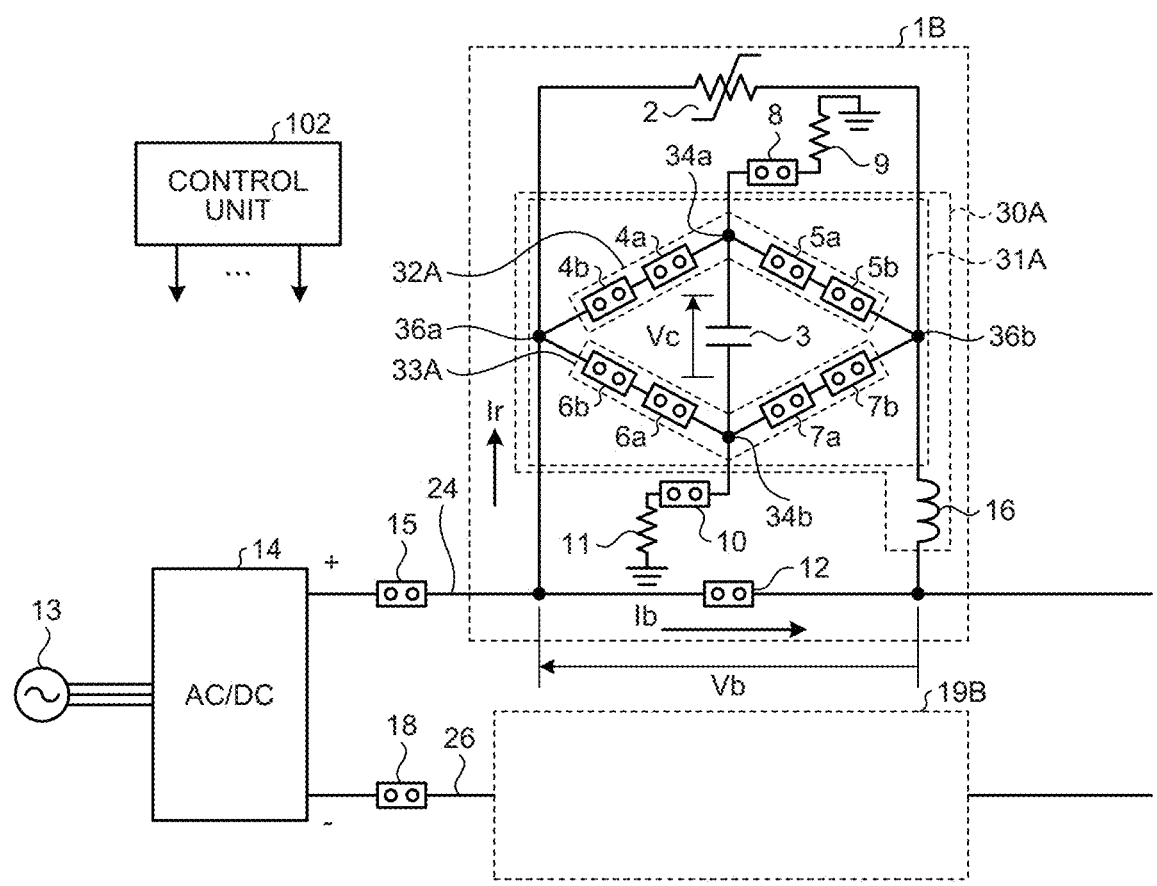
FIG. 14 is a diagram illustrating an example of a circuit configuration of a direct-current breaking device according to a third embodiment.

FIG. 14 is a diagram illustrating an example of a circuit configuration of a direct-current breaking device 1B according to a third embodiment. The direct-current breaking device 1B according to the third embodiment illustrated in FIG. 14 includes a first circuit unit 32A replacing the first circuit unit 32 in the configuration of the first embodiment illustrated in FIG. 1, and a second circuit unit 33A replacing the second circuit unit 33 in the configuration of the first embodiment illustrated in FIG. 1. In FIG. 14, the first circuit unit 32A includes two first switching elements 4a and 4b connected in series with each other and replacing the one first switching element 4 in the first circuit unit 32 illustrated in FIG. 1, and two second switching elements 5a and 5b connected in series with each other and replacing the one second switching element 5 in the first circuit unit 32 illustrated in FIG. 1. In addition, two third switching elements 6a and 6b connected in series with each other replace the one third switching element 6 in the second circuit unit 33, and two fourth switching elements 7a and 7b connected in series with each other replace the one fourth switching element 7 in the second circuit unit 33. Thus, in FIG. 14, each of the switching elements on the respective sides of the bridge circuit 31 is replaced by two switching elements connected in series with each other. As a result of these replacements, the configuration of the third embodiment illustrated in FIG. 14 includes a bridge circuit 31A replacing the bridge circuit 31, and a resonant circuit 30A replacing the resonant circuit 30. In addition, because the direct-current breaking device 19 on the negative polarity side has a similar configuration, the direct-current breaking device is represented by 19B in FIG. 14. Note that the other configuration is the same as or equivalent to that in FIG. 1, and the same or equivalent components are represented by the same reference numerals and redundant description thereof will be omitted.

Figure 15:
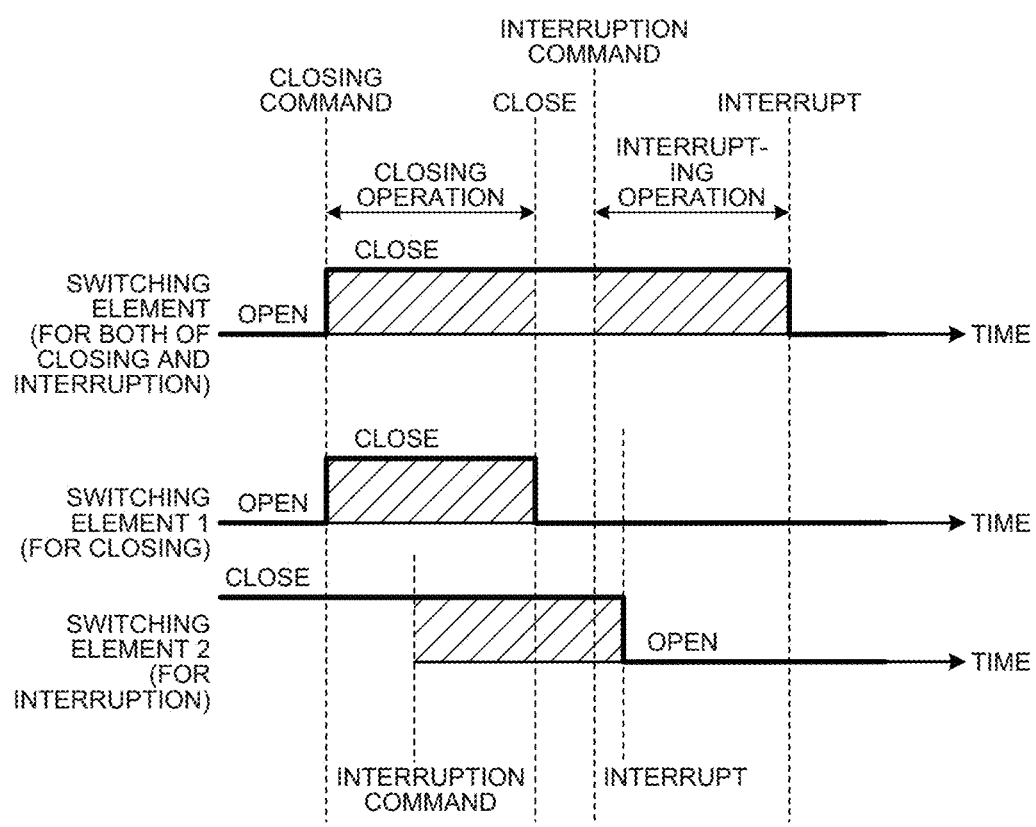
FIG. 15 is a sequence diagram for explaining operation of the direct-current breaking device according to the third embodiment.

FIG. 15 is a sequence diagram for explaining operation of the direct-current breaking device 1B according to the third embodiment. In the third embodiment, a high-speed request when an interruption command is output after a closing command is output is assumed in a manner similar to the second embodiment.

First, the upper part of FIG. 15 illustrates an operation sequence of one switching element in the case where one switching element is present on each of the sides of the bridge circuit. In the case of one switching element, as illustrated, the interrupting operation is started only after completion of the closing operation. In the illustrated example, an interruption command is output after completion of a closing operation; however, even if an interruption command is output before completion of a closing operation, the time from the output of the closing command to the completion of the interruption cannot be shortened to be equal to or shorter than the sum of the closing operation time and the interrupting operation time.

In contrast, the middle part and the lower part of FIG. 15 illustrate operation sequences of two switching elements the case where two switching elements are present on each of the sides of the bridge circuit. In the case of two switching elements, one of the two switching elements is used as a switching element for closing (hereinafter referred to as a "switching element 1"), and the other is used as a switching element for interruption (hereinafter referred to as a "switching element 2"). In this manner, the switching element 1 is set to the open state and the switching element 2 is set to the closed state during normal operation, and all of the switching elements can thus be set to the open state.

In response to a closing command, the switching element 1 is controlled to be "closed". In a case where an interruption command is output before completion of a closing operation, the interruption command can be output to the switching element 2 without waiting for completion of a closing operation of the switching element 1. Thus, the time from the output of the closing command to the completion of the interruption can be shortened to be equal to or shorter than the sum of the closing operation time of one switching element and the interrupting operation time of one switching element. As a result, a high-speed request when an interruption command is output after a closing command is output can be met.

As described above, according to the direct-current breaking device 1B according to the third embodiment, each of the switching elements arranged on the respective sides of the bridge circuit is constituted by two switching elements connected in series with each other, one of which being for closing and the other of which being for interruption. As a result, the operation speed when an interruption command is output after a closing command is output can be increased. In addition, the charging time of the capacitor 3 during high-speed reclosure can be further shortened.

While the configuration in which each of the switching elements arranged on the respective sides of the bridge circuit is constituted by two switching elements connected in series with each other is applied to the first embodiment illustrated in FIG. 1 in the third embodiment, the configuration may alternatively be applied to the second embodiment illustrated in FIG. 13. The effects of the second embodiment are also produced as a result of application to the second embodiment.

Fourth Embodiment

Figure 16:
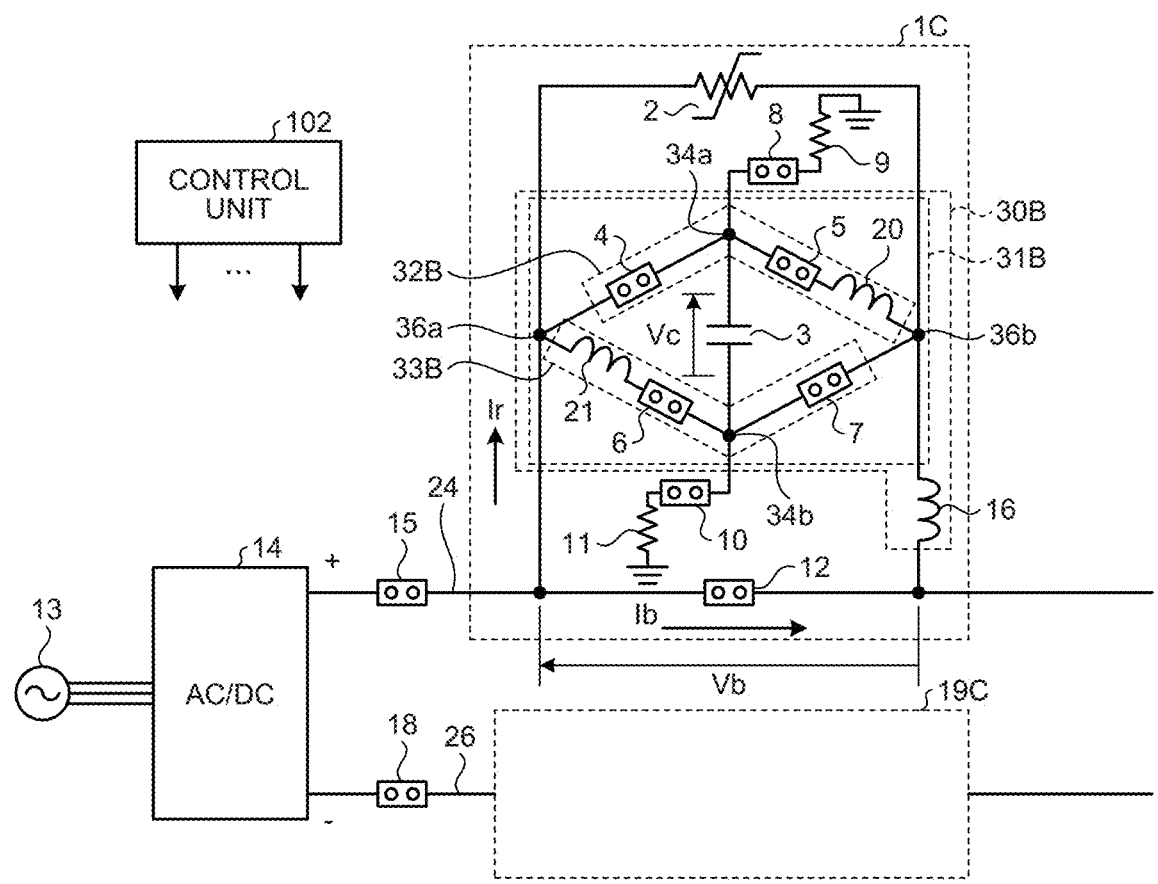
FIG. 16 is a diagram illustrating an example of a circuit configuration of a direct-current breaking device according to a fourth embodiment.

FIG. 16 is a diagram illustrating an example of a circuit configuration of a direct-current breaking device 1C according to a fourth embodiment. The direct-current breaking device 1C according to the fourth embodiment illustrated in FIG. 16 includes a first circuit unit 32B replacing the first circuit unit 32 in the configuration of the first embodiment illustrated in FIG. 1, and a second circuit unit 33B replacing the second circuit unit 33 in the configuration of the first embodiment illustrated in FIG. 1. In FIG. 16, the first circuit unit 323 additionally includes a reactor 20 connected in series with the second switching element 5. In addition, the second circuit unit 333 additionally includes a reactor 21 connected in series with the third switching element 6. Specifically, in FIG. 16, a reactor is additionally connected in series with each of the switching elements of either one combination on opposite sides of the bridge circuit 31B facing each other. Note the additional reactors 20 and 21 may be included in the respective switching elements or may be connected externally to the respective switching elements. As a result of the replacements described above, the configuration of the fourth embodiment illustrated in FIG. 16 includes the bridge circuit 31B replacing the bridge circuit 31, and a resonant circuit 30B replacing the resonant circuit 30. In addition, because the direct-current breaking device 19 on the negative polarity side has a similar configuration, the direct-current breaking device is represented by 19C in FIG. 16. Note that the other configuration is the same as or equivalent to that in FIG. 1, and the same or equivalent components are represented by the same reference numerals and redundant description thereof will be omitted.

Figure 17:
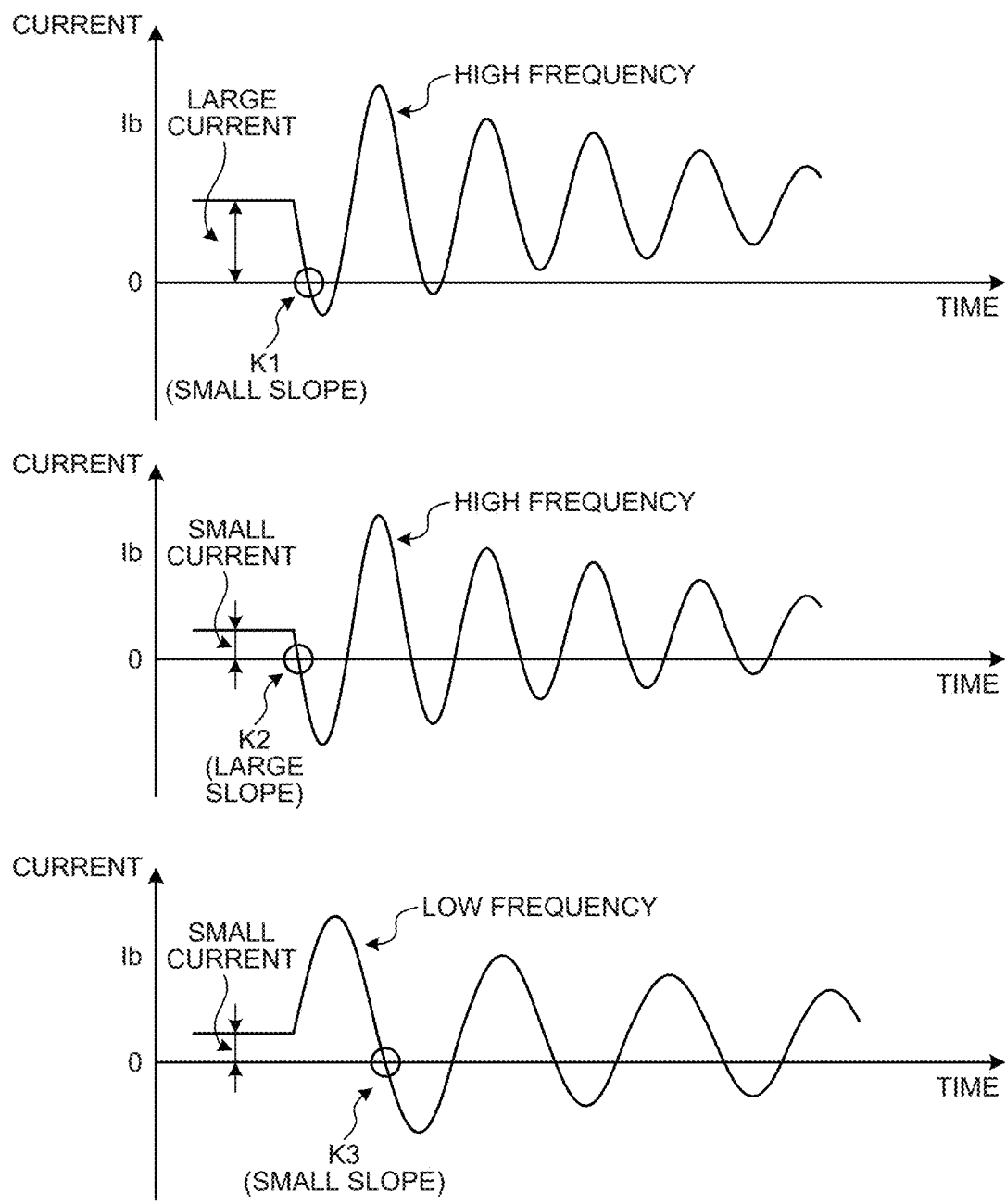
FIG. 17 is a waveform chart for explaining operation of the direct-current breaking device according to the fourth embodiment.

FIG. 17 is a waveform chart for explaining operation of the direct-current breaking device 1C according to the fourth embodiment. FIG. 17 illustrates waveforms of the main circuit breaker current Ib on which a resonant current is superimposed. The upper part illustrates a current waveform when the current is relatively large, and the middle part and the lower part illustrate current waveforms when the current is relatively small. In addition, the upper part and the middle part illustrate the current waveforms when the first switching element 4 and the fourth switching element 7 are controlled to be "closed" and the resonant current is superimposed in the configuration of FIG. 16. In contrast, the lower part illustrates the current waveform when the second switching element 5 and the third switching element 6 are controlled to be "closed" and the resonant current is superimposed in the configuration of FIG. 16. When the second switching element 5 and the third switching element 6 are used, current flows through the reactors 20 and 21. Thus, the slopes of the current rise and fall in the resonant current are gentle as compared with a case where the current does not flow through the reactors 20 and 21.

Next, in a case of interruption of a fault current, for example, the interruption current is large, and a slope K1 of current at a current zero at which a zero crossing first occurs is thus smaller than a slope K2, which will be explained later, as illustrated in the upper part of FIG. 17. In contrast, in a case of interruption of a load current, for example, the interruption current is smaller than the fault current, and the slope K2 of current at a current zero at which a zero crossing first occurs is larger than the aforementioned slope K1 as illustrated in the middle part of FIG. 17. When the sloe K2 is large, the current may not be interrupted at the first current zero.

In contrast, in the case of interruption of the same load current, in the fourth embodiment, the resonant current flows through the reactors connected in series with the switching elements as described above. In this case, as illustrated in the lower part of FIG. 17, the waveform of the resonant current itself becomes gentle, and a slope K3 becomes smaller. As a result, the current can be reliably interrupted at the first current zero.

Figure 18:
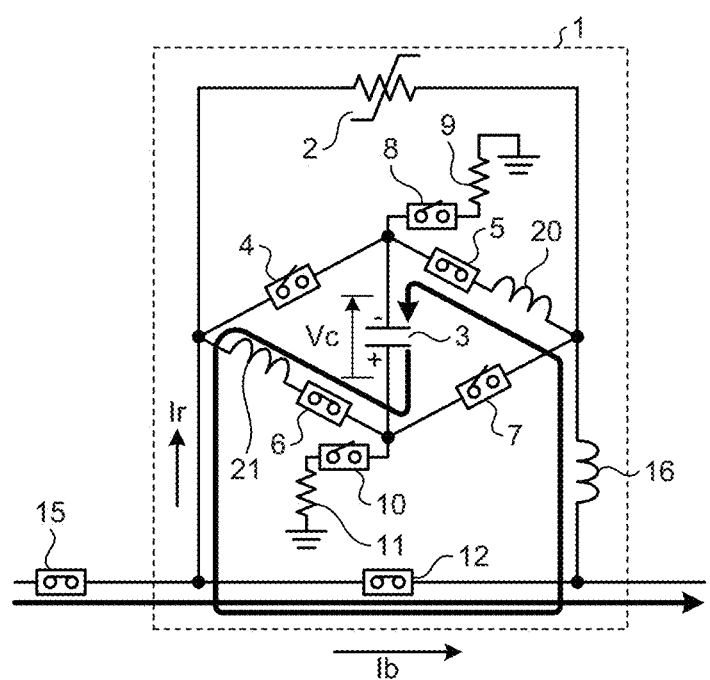
FIG. 18 is a diagram for explaining a path of a resonant current in the direct-current breaking device according to the fourth embodiment.

FIG. 18 is a diagram for explaining a path of a resonant current in the direct-current breaking device 1C according to the fourth embodiment. In the example of the lower part of FIG. 17, as illustrated in FIG. 18, the direction in which the man circuit breaker current Ib flows is the same as the direction in which the resonant current Ir flows. Such a manner of current superimposition is called "forward polarity". The example of FIG. 18 corresponds to the forward polarity because the capacitor 3 is charged with negative polarity. When the capacitor 3 is charged with positive polarity, the resonant current Ir can be caused to flow through a path opposite of that in FIG. 18, that is, with reverse polarity, which enables a current zero to be reached earlier.

In the case of the configuration of the fourth embodiment, the following operations, for example, can be performed in practice.

(1) For interrupting a fault current, switching elements on the sides where reactors are provided are used to interrupt the current.

(2) For interrupting a current other than a fault current, switching elements on the sides where reactors are not provided are used to interrupt the current.

As described above, according to the direct-current breaking device 1C according to the fourth embodiment, a reactor is additionally connected in series with each of the switching elements of either one combination on opposite sides of the bridge circuit facing each other. As a result, current interruption of even a current other than a fault current can be reliably performed at a first current zero.

While the configuration in which a reactor is additionally connected in series with each of the switching elements of one combination on opposite sides of the bridge circuit 31B facing each other is applied to the first embodiment illustrated in FIG. 1 in the fourth embodiment, the configuration may alternatively be applied to the second embodiment illustrated in FIG. 13 and to the third embodiment illustrated in FIG. 14. The effects of the second and third embodiments are also produced as a result of application to the second and third embodiments.

Note that the configurations presented in the embodiments above are examples of the present invention, and can be combined with other known technologies or can be partly omitted or modified without departing from the scope of the present invention.

REFERENCE SIGNS LIST 1, 1A, 1B, 1C, 19, 19A, 19B, 19C direct-current breaking device; 2 MOSA; 3 capacitor; 4 first switching element; 5 second switching element; 6 third switching element; 7 fourth switching element; 8, 10 charging switch; 9, 11 charging resistor; 12 main circuit breaker; 13 AC system; 14 AC/DC converter; 15, 18 disconnector; 16 reactor; 24, 26 DC line; 30, 30A, 30B resonant circuit; 31, 31A, 31B bridge circuit; 32, 32A first circuit unit; 33, 33A second circuit unit; 34a, 34b, 36a, 36b connection point; 102 control unit; 200 processor; 202 memory; 204 interface.

The invention claimed is:

1. A direct-current breaking device comprising:
a main circuit breaker inserted on a DC line;
a resonant circuit connected in parallel with the main circuit breaker; and
an energy absorber connected in parallel with the main circuit breaker via the resonant circuit,
wherein the resonant circuit includes first, second, third, and fourth switchers, a capacitor, and a reactor,
a first circuit and a second circuit are connected in parallel, the first circuit including the first switcher and the second switcher connected in series with each other, the second circuit including the third switcher and the fourth switcher connected in series with each other, and
the capacitor is connected between a connection point of the first switcher and the second switcher and a connection point of the third switcher and the fourth switcher to constitute a bridge circuit, and the bridge circuit and the reactor are connected in series with each other,
the direct-current breaking device, further comprising:
a first switch connected to one end of the capacitor;
a first charging resistor grounded via the first switch;
a second switch connected to another end of the capacitor; and
a second charging resistor grounded via the second switch, wherein
any one of the first switcher, the second switcher, the third switcher, and the fourth switcher and either one of the first switch and the second switch are controlled to be in a closed state depending on a state of the main circuit breaker, so that the capacitor is charged with positive polarity or negative polarity.

2. The direct-current breaking device according to claim 1, wherein when a fault current flows through the main circuit breaker, the resonant circuit controls switchers on opposite sides of the bridge circuit facing each other to be in a closed state.

3. A direct-current breaking device comprising:
a main circuit breaker inserted on a DC line;
a resonant circuit connected in parallel with the main circuit breaker; and
an energy absorber connected in parallel with the main circuit breaker via the resonant circuit;
wherein the resonant circuit includes
first, second, third, and fourth switchers, a capacitor, and a reactor,
a first circuit and a second circuit are connected in parallel, the first circuit including the first switcher and the second switcher connected in series with each other, the second circuit including the third switcher and the fourth switcher connected in series with each other, and the capacitor is connected between a connection point of the first switcher and the second switcher and a connection point of the third switcher and the fourth switcher to constitute a bridge circuit, and the bridge circuit and the reactor are connected in series with each other, wherein each of switchers arranged on respective sides of the bridge circuit is constituted by two switchers connected in series with each other, one of the two switchers being used for closing, another of the two switchers being used for interruption.

4. The direct-current breaking device according to claim 3, wherein when a fault current flows through the main circuit breaker, the resonant circuit controls switchers on opposite sides of the bridge circuit facing each other to be in a closed state.

5. A direct-current breaking device comprising:
a main circuit breaker inserted on a DC line;
a resonant circuit connected in parallel with the main circuit breaker; and
an energy absorber connected in parallel with the main circuit breaker via the resonant circuit;
wherein the resonant circuit includes
first, second, third, and fourth switchers, a capacitor, and a first reactor,
a first circuit and a second circuit are connected in parallel, the first circuit including the first switcher and the second switcher connected in series with each other, the second circuit including the third switcher and the fourth switcher connected in series with each other, and the capacitor is connected between a connection point of the first switcher and the second switcher and a connection point of the third switcher and the fourth switcher to constitute a bridge circuit, and the bridge circuit and the first reactor are connected in series with each other, wherein a second reactor is connected in series with the first or fourth switcher, and a third reactor is connected in series with the second or third switcher, and wherein the second and third reactor are on opposite sides of the bridge circuit facing each other.

6. The direct-current breaking device according to claim 5, wherein
for interruption of a fault current, the switchers on the sides on which the reactors are included are used to interrupt the current, and
for interruption of a current other than a fault current, the switchers on sides on which the reactors are not included are used to interrupt the current.

7. The direct-current breaking device according to claim 5, wherein when a fault current flows through the main circuit breaker, the resonant circuit controls switchers on opposite sides of the bridge circuit facing each other to be in a closed state.

* * * * *